US012752576B2

(12) United States Patent
Potin et al.

(10) Patent No.: US 12,752,576 B2
(45) Date of Patent: Oct. 6, 2026

(54) BICYCLE TIRE OPTIMIZED FOR ELECTRIC ASSISTANCE

(71) Applicant: COMPAGNIE GENERALE DES ETABLISSEMENTS MICHELIN, Clermont-Ferrand (FR)

(72) Inventors: Yves Potin, Clermont-Ferrand Cedex (FR); Guillaume Hennebert, Clermont-Ferrand Cedex (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 147 days.

(21) Appl. No.: 18/572,679

(22) PCT Filed: Jun. 13, 2022

(86) PCT No.: PCT/FR2022/051116

§ 371 (c)(1),
(2) Date: Dec. 20, 2023

(87) PCT Pub. No.: WO2022/269160

PCT Pub. Date: Dec. 29, 2022

(65) Prior Publication Data

US 2024/0286438 A1 Aug. 29, 2024

(30) Foreign Application Priority Data

Jun. 21, 2021 (FR) ........................................ 2106557

(51) Int. Cl.
*B60C 13/02* (2006.01)
*B60C 13/00* (2006.01)

(52) U.S. Cl.
CPC ........ *B60C 13/02* (2013.01); *B60C 2013/006* (2013.01); *B60C 2013/007* (2013.01); *B60C 2200/12* (2013.01)

(58) Field of Classification Search
CPC .............. B60C 13/02; B60C 2013/006; B60C 2013/007; B60C 2200/12
See application file for complete search history.

(56) References Cited

U.S. PATENT DOCUMENTS 4,414,363 A * 11/1983 Akita ........................ C08L 7/00
525/236
5,078,227 A 1/1992 Becker
(Continued)

FOREIGN PATENT DOCUMENTS

DE 10 2010 060 808 6/2011
EP 3 016 846 3/2020
(Continued)

OTHER PUBLICATIONS

Olsommer, English Machine Translation of FR 3088189, 2020 (Year: 2020).*

*Primary Examiner* — Justin R Fischer
*Assistant Examiner* — Brendon Charles Darby
(74) *Attorney, Agent, or Firm* — COZEN O'CONNOR

(57) ABSTRACT

A tire (1) for an electrically assisted bicycle or wheelchair having tire a crown reinforcement, which is radially on the inside of a tread, with the tread being connected to two beads via two sidewalls. The tire has, on at least one of the sidewalls (3) and protruding from the sidewall, a strip (4) of a rubber compound with an axial thickness (ep) that is at least equal to 1 mm and at most equal to 4 mm, at least equal to 10 mm and at most equal to 30 mm. The rubber compound has a Shore A hardness of between 55 and 75, and a glass transition temperature of between −15° C. and 0° C. The compound forms a smooth outer surface (5) that is intended to come into contact with a drive roller bearing a plurality of indenting elements.

4 Claims, 1 Drawing Sheet

(56) References Cited

U.S. PATENT DOCUMENTS

2016/0236520 A1 8/2016 Bestgen et al.
2018/0304690 A1* 10/2018 Misani .................. B60C 9/2204

FOREIGN PATENT DOCUMENTS

FR 3 088 189 5/2020
WO WO 2015/049263 4/2015

* cited by examiner

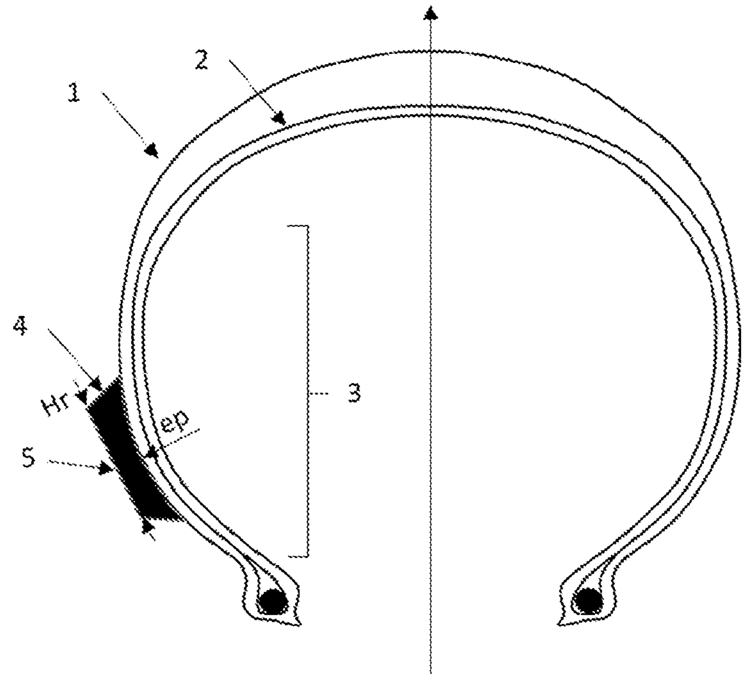
1
2
3
4
5
Hr
ep

BICYCLE TIRE OPTIMIZED FOR ELECTRIC ASSISTANCE

RELATED APPLICATIONS

This is a U.S. National Phase Application under 35 USC 371 of International Application PCT/FR2022/051116 filed on Jun. 13, 2022.

This application claims the priority of French application no. FR 2106557 filed Jun. 21, 2021, the entire content of all of which is hereby incorporated by reference.

FIELD OF THE INVENTION

The subject of the present invention is a bicycle tire that is optimized for electrical assistance and is more specifically intended to be fitted to any lightweight means of transport that primarily uses bicycle tires, has a motor and is therefore electrically assisted, such as an electric bicycle, tricycle or wheelchair. The present invention also includes the system designed to use said tire.

BACKGROUND OF THE INVENTION

There are a multitude of wheel drive systems for electrically assisted bicycles or wheelchairs. The wheel can be driven by means of a roller, portions of the rolling surface of which are made of rubber, making contact with the metal portion of the wheel, but this system loses much of its efficiency during periods of wet weather, since the wet metal is particularly slippery. It not possible to drive the wheel by means of this type of roller making contact with the sidewall of the tire since the contact temperature quickly becomes too high, and the tire or roller quickly deteriorates. Furthermore, in wet conditions, the contact between two rubber surfaces provides little grip.

Many systems use rollers in contact with the tread, but this contributes significantly to reducing the service life of the tire, especially since the tread of the tire is designed to offer good grip in all weather conditions on tarmac roads or paths using tread patterns, but not to transmit torque via a relatively aggressive roller.

Knurled metal drive rollers are particularly beneficial on account of their longevity, but cause particularly rapid wear by grooving.

Another beneficial system consists of arranging a rubber toothset on the sidewall of the tire and driving said rubber toothset via a toothed roller, the intermeshing teeth causing little friction and therefore little wear or heating (WO 2015049263 A1). This system provides very good torque transmission, even during periods of wet weather, and protects the tread from becoming worn too quickly. However, it requires the roller and the tire to be precisely positioned, which necessitates the intervention of professionals who are not always readily available.

SUMMARY OF THE INVENTION

The inventors have set themselves the aim of improving the device by improving each part thereof, starting with the tire, in order to achieve excellent torque transmission, even in wet conditions, without it being necessary for the roller to be positioned very precisely in relation to the tire and without adversely affecting the durability of the components of the device, either the drive roller or the tire.

This aim has been achieved, according to an embodiment of the invention, by a tire that is intended to be fitted to an electrically assisted bicycle or wheelchair and comprises:

- a crown reinforcement, which is radially on the inside of a tread, said tread being connected to two beads via two sidewalls,
- the tire comprising, on at least one of the sidewalls and protruding from the sidewall, a strip of a rubber compound with an axial thickness, perpendicular to the sidewall, that is at least equal to 1 mm and at most equal to 4 mm, and with a radial height, perpendicular to the axis of revolution of the tire, that is at least equal to 10 mm and at most equal to 30 mm,
- said rubber compound of the strip having a Shore A hardness of between 55 and 75, and a glass transition temperature of between −15° C. and −0° C.,
- said rubber compound of the strip forming a smooth outer surface that is intended to come into contact with a drive roller bearing a plurality of indenting elements.

Generally, a tire comprises a tread intended to come into contact with the ground via a tread surface, the two axial ends of which are connected via two sidewalls to two beads that provide the mechanical connection between the tire and the rim on which it is intended to be mounted. The sidewall of a bicycle tire comprises, from the inside of the tire towards the outside: an inner liner, a carcass layer comprising textile reinforcers and a sidewall rubber that has the function of protecting the carcass layer against mechanical attacks and against ultraviolet light; the total thickness of the sidewall of a bicycle tire rarely exceeds 2 mm.

The tire according to an embodiment of the invention also comprises, preferably on a single sidewall, a strip of a rubber compound. This strip is arranged so as to be able to come into contact with a metal drive roller equipped with indenting elements in order to set the bicycle wheel in motion, specifically with the axis of the roller belonging to a plane that contains the axis of rotation of the tire. Such a force-transmitting roller will have a total axial height of between 10 and 30 mm, corresponding to the minimum height required to transmit the desired torque and to the maximum radial height available on a bicycle tire on which to adhesively bond a strip of a rubber compound, respectively.

The expression “rubber compound” or rubber denotes a composition of rubber comprising at least an elastomer and a filler.

In order to avoid any damage to the sidewall rubber, the thickness of the strip of rubber compound is between 1 and 4 mm.

So as not to disrupt the contact with the indenting elements of the drive roller, the outer surface of the strip of rubber compound, which is intended to come into contact with said indenting elements, is smooth. This means that said outer surface does not have any reliefs or markings that are larger than 0.5 mm. It may have a rugosity of up to 500 micrometres.

The rubber compound in rotational contact with the drive roller must be deformable in order to avoid blunting the indenting elements and to enable the transmission of drive forces. The rubber compound forming the strip in contact with the indenting element has a Shore A hardness of between 55 and 75, and a glass transition temperature of between −15° C. and 0° C.

A conventional physical characteristic of an elastomeric compound is its glass transition temperature Tg, the temperature at which the elastomeric compound passes from a deformable rubbery state to a rigid glassy state. The glass transition temperature Tg of an elastomeric compound is generally determined during the measurement of the dynamic properties of the elastomeric compound, on a viscosity analyser for example of the Metravib VA4000 type, according to the standard ASTM D 5992-96. The dynamic properties are measured on a sample of vulcanized elastomeric compound, that is to say elastomeric compound that has been cured to a degree of conversion of at least 90%, the sample having the form of a cylindrical test specimen having a thickness equal to 2 mm and a cross-sectional area equal to 78.5 $mm^2$. The response of the sample of elastomeric compound to a simple alternating sinusoidal shear stress, having a peak-to-peak amplitude equal to 0.7 MPa and a frequency equal to 10 Hz, is recorded. A temperature sweep is carried out at a constant rate of rise in temperature of +1.5° C./min. The results utilized are generally the complex dynamic shear modulus G*, comprising an elastic part G' and a viscous part G", and the dynamic loss tan δ, equal to the ratio G"/G'. The glass transition temperature Tg is the temperature at which the dynamic loss tan δ reaches a maximum during the temperature sweep. The expression "rubber compound" or rubber denotes a composition of rubber comprising at least an elastomer and a filler.

The mechanical behaviour of an elastomeric compound can be characterized, under static conditions, by its Shore A hardness, measured in accordance with the standards DIN 53505 or ASTM 2240, and, under dynamic conditions, by its complex dynamic shear modulus G*, as defined above, at a given temperature, typically at 23° C.

For a Shore hardness less than 55 or greater than 75, the drive roller is unable to transmit torque, either because it does not sufficiently indent the surface of the contact strip or because it deforms said surface too easily without creating shear. If the maximum of the dynamic loss tan δ lies outside the claimed range, the compound of the contact strip is destroyed, either by cracking or by reversion caused by excessively high temperature.

The invention also comprises a lightweight vehicle such as a bicycle, tricycle or wheelchair comprising a tire as described previously, wherein a metal roller drives at least one such tire of the vehicle by rotational contact with the strip of rubber compound arranged on the sidewall of said tire, this tire being specifically designed for these applications in order to improve the longevity and the driving precision thereof in all weather conditions.

BRIEF DESCRIPTION OF THE DRAWINGS

FIG. 1 is schematic and not drawn to scale illustration of a bicycle tire according to the disclosed embodiments.

DETAILED DESCRIPTION OF THE DRAWINGS

FIG. 1 shows a meridian cross section of a bicycle tire 1 having a carcass layer 2, sidewalls 3 and, arranged so as to protrude from one of the sidewalls 3, a strip 4 of rubber compound having a smooth surface 5 that can come into contact with a drive roller equipped with indenting elements. The height Hr of the strip is between 10 and 30 mm and its thickness ep is between 1 and 4 mm.

The development of the invention required tests in order to determine the rubber compound most capable of transmitting force without deteriorating over time. Several machine tests were carried out:

- A grip test in wet conditions: a bicycle wheel equipped with a dynamometer is driven by a motor equipped with the drive roller being tested. A smooth strip of the rubber compound being tested is adhesively bonded to the sidewall of the tire. The test is carried out with water being sprayed. Solutions that do not allow a torque of 20 Nm to be transmitted are eliminated.
- A 5000 km wear test is carried out on the same test bed but without water being sprayed. Solutions exhibiting wear are discarded.

For the contact strip of rubber compound adhesively bonded to the sidewall of the tire, 25 rubber compounds were tested. Their Shore A hardnesses were between 50 and 80, this parameter being linked to their stiffnesses, and their glass transition temperatures, this parameter being linked to grip, were between −90° C. and −10° C. The 3 satisfactory solutions for the two tests all have a Shore A hardness of between 55 and 75, and the glass transition temperature thereof, at which the dynamic loss tan δ is at a maximum, is between −15° C. and −0° C.

Experience has shown, for example, that the rubber compounds of bicycle tire treads, the glass transition temperatures of which are extremely low, usually between −50° C. and −60° C., do not allow the invention to work. This is because these compounds are designed to provide grip, at a high pressure of between 8 and 15 bar, on asphalt or bare ground and are not designed to be driven by a metal roller equipped with indenting elements that stress the compound at a different frequency to the intended usage of said compound. These compounds were quickly destroyed by the roller.

One solution, with a tire as described in the invention combined with a contact strip made of rubber compound having a Shore hardness equal to 63 and a glass transition temperature equal to −5° C., successfully completed the selection tests.

A validation test on an electrically assisted bicycle in urban usage over 1500 km allowed the chosen solution to be validated in actual usage conditions.

The invention offers a solution to the problem while maintaining excellent handling in wet conditions since the indenting elements break through the film of water at the surface in contact with the tire. The flexibility of contact between the roller and the tire allows extremely simple positioning of one on the other. After 1500 km of urban usage, the rubber strip adhesively bonded to the sidewall of the tire exhibits no sign of wear.

The invention therefore successfully provides a solution that is simple to install, provides excellent grip in wet conditions and is beneficial in terms of wear and therefore durable.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire intended to be fitted to an electrically assisted bicycle or wheelchair, the tire comprising:

a crown reinforcement, which is radially on the inside of a tread, said tread being connected to two beads via two sidewalls, wherein the tire comprises, on at least one of the sidewalls and protruding from the sidewall, a strip of a rubber compound with an axial thickness (ep), perpendicular to the sidewall, that is at least equal to 1 mm and at most equal to 4 mm, and with a radial height (Hr), perpendicular to the axis of revolution of the tire, that is at least equal to 10 mm and at most equal to 30 mm, in that said rubber compound of the strip has a Shore A hardness of between 55 and 75, and a glass transition temperature of between −15° C. and −0° C., and in that said rubber compound of the strip forms a smooth outer surface that is intended to come into contact with a drive roller bearing a plurality of indenting elements.

2. The tire of claim 1, wherein the strip is not a tread strip.

3. The tire of claim 1, wherein the radial height (Hr) of the strip is less than a height of the sidewall.

4. A lightweight vehicle, such as a bicycle, tricycle or wheelchair, comprising a tire according to claim 1, wherein a metal roller drives at least one tire of the vehicle by rotational contact with the strip of rubber compound arranged on the sidewall of said tire.

* * * * *